United States Patent
Alieiev et al.

(10) Patent No.: US 11,323,898 B2
(45) Date of Patent: May 3, 2022

(54) METHOD FOR MONITORING THE QUALITY OF A DATA CONNECTION, SUBSCRIBER STATION, AND NETWORK MANAGEMENT UNIT FOR USE IN THE METHOD

(71) Applicant: VOLKSWAGEN AKTIENGESELLSCHAFT, Wolfsburg (DE)

(72) Inventors: Roman Alieiev, Stendal (DE); Andreas Kwoczek, Lehre (DE); Thorsten Hehn, Wolfsburg (DE)

(73) Assignee: Volkswagen Aktiengesellschaft

( * ) Notice: Subject to any disclaimer, the term of this patent is extended or adjusted under 35 U.S.C. 154(b) by 0 days.

(21) Appl. No.: 16/343,318

(22) PCT Filed: Oct. 16, 2017

(86) PCT No.: PCT/EP2017/076318
§ 371 (c)(1),
(2) Date: Apr. 18, 2019

(87) PCT Pub. No.: WO2018/073162
PCT Pub. Date: Apr. 26, 2018

(65) Prior Publication Data
US 2019/0246303 A1    Aug. 8, 2019

(30) Foreign Application Priority Data

Oct. 21, 2016  (DE) .................. 10 2016 220 724.5
Mar. 15, 2017  (DE) .................. 10 2017 204 326.1

(51) Int. Cl.
*H04W 24/08*  (2009.01)
*H04W 84/18*  (2009.01)
(Continued)

(52) U.S. Cl.
CPC ...... *H04W 24/08* (2013.01); *G08G 1/096775* (2013.01); *G08G 1/096791* (2013.01);
(Continued)

(58) Field of Classification Search
CPC ............ H04W 24/08; H04W 80/08; G08G 1/096791; G08G 1/096775; G08G 1/22; G08G 1/164; G08G 1/161
See application file for complete search history.

(56) References Cited

U.S. PATENT DOCUMENTS

2002/0054578 A1   5/2002  Zhang et al.
2006/0268933 A1* 11/2006  Kellerer ............. H04L 67/14
                                               370/469
(Continued)

FOREIGN PATENT DOCUMENTS

CN    102938892 A    2/2013
CN    103200572 A    7/2013
(Continued)

OTHER PUBLICATIONS

ETSI TS 136 211; LTE; Evolved Universal Terrestrial Radio Access (E-UTRA); Physical channels and modulation; 3GPP TS 36.211; version 13.1.0, Release 13; Apr. 2016.
(Continued)

*Primary Examiner* — Jeffrey M Rutkowski
*Assistant Examiner* — Chae S Lee
(74) *Attorney, Agent, or Firm* — Barnes & Thornburg, LLP

(57) ABSTRACT

Monitoring of quality of service includes monitoring the quality measured at the radio modem based on measurements in the physical layer and monitoring of the network state by the physical layer or a higher layer wherein the
(Continued)

monitoring entity bypasses one or more intermediate layers and directly accesses the physical layer, which provides the necessary information.

15 Claims, 3 Drawing Sheets

(51) Int. Cl.
- *G08G 1/0967* (2006.01)
- *G08G 1/00* (2006.01)
- *H04W 80/08* (2009.01)
- *G08G 1/16* (2006.01)
- *H04W 84/04* (2009.01)

(52) U.S. Cl.
CPC .......... *G08G 1/161* (2013.01); *G08G 1/164* (2013.01); *G08G 1/22* (2013.01); *H04W 80/08* (2013.01); *H04W 84/042* (2013.01); *H04W 84/18* (2013.01)

(56) References Cited

U.S. PATENT DOCUMENTS

| | | | |
|---|---|---|---|
| 2009/0147684 A1 | 6/2009 | Majidi-Ahy | |
| 2010/0256852 A1* | 10/2010 | Mudalige | G08G 1/22 701/24 |
| 2012/0069748 A1* | 3/2012 | Van Den Bogaert | H04W 24/10 370/252 |
| 2013/0301584 A1* | 11/2013 | Addepalli | H04L 67/32 370/329 |
| 2014/0348102 A1 | 11/2014 | Wang | |
| 2015/0063152 A1* | 3/2015 | Chiang | H04L 41/14 370/252 |
| 2015/0156814 A1* | 6/2015 | Yie | H04W 80/06 370/329 |
| 2016/0082839 A1 | 3/2016 | Ricci | |
| 2017/0289864 A1* | 10/2017 | Narasimha | H04W 36/0009 |

FOREIGN PATENT DOCUMENTS

| | | |
|---|---|---|
| CN | 104869654 A | 8/2015 |
| DE | 10356256 A1 | 7/2005 |
| EP | 2437541 A2 | 4/2012 |
| WO | 9845994 A2 | 10/1998 |

OTHER PUBLICATIONS

ETSI TS 136 213; LTE; Evolved Universal Terrestrial Radio Access (E-UTRA); Physical layer procedures; 3GPP TS 36.213; version 13.0.0, Release 13; May 2016.

Huawei et al.; Congestion Control for Uu and PC5 based V2X transmission; 3GPP Draft; vol. RAN WG2; Nanjing, China; May 22, 2016.

Search Report for International Patent Application No. PCT/EP2017/076318; dated Jan. 22, 2018.

Office Action for Chinese Patent Application No. 201780064873.0; dated Sep. 10, 2021.

* cited by examiner

METHOD FOR MONITORING THE QUALITY OF A DATA CONNECTION, SUBSCRIBER STATION, AND NETWORK MANAGEMENT UNIT FOR USE IN THE METHOD

PRIORITY CLAIM

This patent application is a U.S. National Phase of International Patent Application No. PCT/EP2017/076318, filed 16 Oct. 2017, which claims priority to German Patent Application Nos. 10 2016 220 724.5, filed 21 Oct. 2016, and 10 2017 204 326.1, filed 15 Mar. 2017, the disclosures of which are incorporated herein by reference in their entireties.

SUMMARY

Illustrative embodiments relate to a method for monitoring the quality of a data connection in which data about a radio channel that is subject to interference are transmitted to at least one reception station. Illustrative embodiments also relate to a subscriber station and a network management unit for use in the method.

BRIEF DESCRIPTION OF THE DRAWINGS

An exemplary embodiment is depicted in the drawings and is explained in more detail below on the basis of the figures, in which.

DETAILED DESCRIPTION

Figure 1:
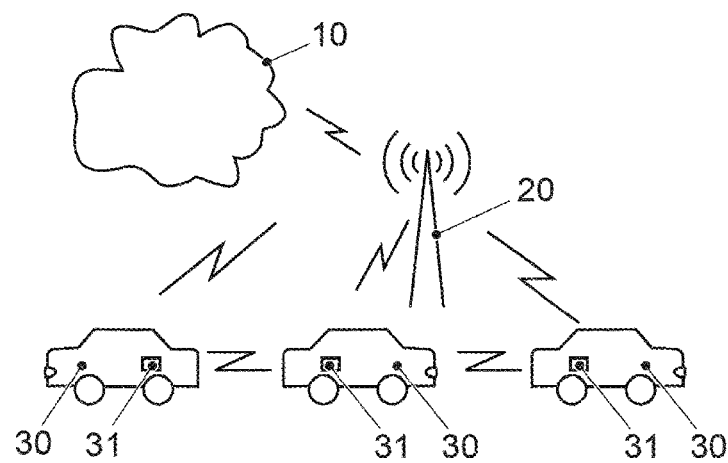
FIG. 1 shows the principle of transportation vehicle communication by mobile radio.

For the scenario of transportation vehicles equipped with radiocommunication modules and communicating with one another directly in public road traffic, be it for cooperative or autonomous driving, a very high level of reliability for safety-critical applications is very important. Techniques for vehicle-to-vehicle direct communication have already been developed and are being developed further. An example that is mentioned is vehicle direct communication via WLAN, in this case the option based on the WLAN standard IEEE 802.11p. This technique involves ad hoc WLAN networks being set up for the communication between the transportation vehicles (communication within the realm of the "Ad Hoc Domain").

Vehicle communication is also possible in the realm of mobile radio networks, however. This technique requires the base station to convey the messages from transportation vehicle to transportation vehicle, however. This is the realm in which communication takes place in what is known as the "infrastructure domain". For the future mobile radio generation, vehicle direct communication is also being rendered possible. In the case of LTE, this option is called LTE-V, and in the case of the 5G initiative, this option is called D2D.

Typical communication scenarios are safety scenarios, traffic efficiency scenarios and infotainment. For the realm of safety, the following scenarios are cited: "Cooperative Forward Collision Warning", "Pre-Crash Sensing/Warning", "Hazardous Location Warning". In these realms, the transportation vehicles exchange information with one another such as position, direction and speed, including parameters such as size and weight. Further information transmitted relates to intention information, such as transportation vehicle intends to overtake, transportation vehicle is turning left/right, etc., which is of interest for cooperative driving. Sensor data are often transmitted in this case. If there is a hazardous situation and the driver does not react, the transportation vehicle could automatically slow down, so that an accident is prevented or at least the consequences in the event of an unavoidable accident are kept as minor as possible.

The following are cited in the realm of traffic efficiency: "Enhanced Route Guidance and Navigation", "Green-Light Optimal Speed Advisory" and "V2V Merging Assistance".

In the realm of infotainment, Internet access is in the foreground.

The lists show that, in the realm of safety, time-critical data transmissions take place. Thus, the reliability of vehicle-to-vehicle communication is of critical importance.

In mobile radio, reliability of the data transmission means completeness (all useful data sent arrive at the receiver) and correctness (the useful data sent and the useful data recovered from the received data are concordant). To this end, various methods are used in mobile radio technologies, e.g., frequency diversity, spatial diversity, sensible choice of the type of modulation and modulation parameters and of the channel code to be used, and also of a code rate, etc.!

At present, the following mobile radio technologies can be used for vehicle-to-vehicle communication: 3GPP-based UMTS, HSPA, LTE, and the future 5G standards. For vehicle direct communication, LTE-V and 5G D2D are mentioned.

As soon as data need to be transmitted with periodic recurrence, it is more efficient to reserve transmission resources for transmitting these data and to allocate these transmission resources to the transmission station. This task is undertaken in mobile radio standards today by a management unit, which is also known by the term scheduler. Today, this management unit is typically arranged in the mobile radio base station. In the case of the LTE mobile communication system, the base station is referred to as eNodeB for short, corresponding to "evolved node basis".

There is thus the situation that, for the direct communication between transportation vehicles on a mobile radio basis (LTE-V, 5G), the transmission takes place from transportation vehicle to transportation vehicle but the network provider uses the base station eNodeB to control the resources. Using this so-called scheduling, the mobile radio provider stipulates which frequency resource can be used for direct communication at which time.

In mobile radio, all activities of the users within a cell are orchestrated by the base station. The scheduler, which is normally a software component in the base station, notifies each subscriber of the time at which and the frequencies of the transmission frame on which it is permitted to send particular data. Its main task is thus fairly assigning the transmission resources to the different subscribers. This avoids collisions, regulates the data traffic in both transmission directions, from a subscriber (uplink) and to a subscriber (downlink), and allows efficient access for a large number of users.

More and more applications in transportation vehicles need a data connection. In recent years, many applications have been added that need a connection to a server, such as, e.g., GOOGLE® Maps Navigation, and telephony, applications from the realm of infotainment such as Internet radio, video streaming services and weather services.

In some cases, such services do not make particularly high demands of the data connection. Although other services, such as audio and video streaming services, make increased demands, they are not safety-relevant and the variations in data rate and latency can be absorbed by buffering measures at application level (e.g., streaming buffers). Some applications even require just a sporadic data connection to obtain up-to-date information from a server and to display it to the user.

More recent applications make significantly greater demands on the communication. In the realm of safety-relevant applications, the latency of the data transmission and the reliability of the data transmission play an important part. Some areas of application such as, e.g., the interchange of transportation vehicle raw sensor data based on which, e.g., coordinated control of road users takes place, require a particular data rate and latency to work properly. Demands of this type and referred to generally as quality of service demands, QoS for short. In the case of the LTE (Long Term Evolution) mobile communication system, the radio bearer concept has been used to specify a solution that is meant to implement QoS in the mobile radio realm. It was standardized by the 3GPP in the specification TS 23.401. This concept is often not used in practice, however.

In the realm of IP networks, QoS solutions are standardized. Examples of the known solutions in the IP network realm are the protocols Integrated Services IntServ, Resource Reservation Protocol RSVP, Differentiated Services DiffServ and Multiprotocol Label Switching MPLS. These solutions are not designed for the realm of mobile radio networks, however.

Current mobile radio modems provide the user with only limited access to data from the lower layers. Instead, according to the classical ISO/OSI layer model of communication, they isolate the lower layers from the application layer. This also makes sense for conventional applications in mobile radio. Each layer i provides the layer above it i+1 with as good a service as possible ("best effort"). The independence of the layers has the purpose of each layer being able to be individually developed, optimized and also replaced with another implementation (e.g., from a different manufacturer).

WO 98/45994A2 discloses the practice of adding what is known as an "Upward Service Access Point" per layer of the ISO/OSI layer model of data communication to an Open System Interconnection System OSI to forward quality of services parameters to the next higher layer in each case.

At the same time, current technical implementations provide an opportunity for an application to observe the current situation on the lower layer. This is highly simplified and delayed information, however, e.g., to allow the bar display in the case of mobile phones. Such implementations are based on the application of the AT instruction set that is used for configuring and parameterizing modems and is also known by the term Hayes-compatible instruction set. The ITU-T has implemented this instruction set in the recommendation V.250.

US 2009/147684A1 discloses dynamic, integrated "Multi-Service Cross Layer" optimization. This shows various cross-layer interactions between the seven layers of the ISO/OSI layer model of data communication.

An application with a module for customizing the quality of service settings is known from US 2002/054578A1.

From the point of view of an application developer from the automotive environment, this state is inadequate. A transportation vehicle function is supposed to have only controlled failures, so that the customer or, in future, the driver assistance systems ADAS (Advanced Driver Assistance Systems) can already be notified, before the function is used, that the function is impaired or even unavailable. The current scheme based on the AT instruction set and the observability in the mobile radio realm is inadequate and prevents an approach of this kind. From the point of view of the application developer, the change in connection quality has the effect of a random process and happens unpredictably quickly.

There is thus a need for an improved quality of service monitoring system that is supposed to be used for transportation vehicle-relevant applications.

Disclosed embodiments provide a method of monitoring the quality of a data connection, a subscriber station, and a network management.

The solution involves a form of quality of service monitoring that makes quality of service significantly more attractive for transportation vehicle-relevant applications. This applies both to transportation vehicle manufacturers and to network operators and, in a more general sense, to all providers of applications that require high availability and low latency ("mission-critical applications").

The presented concept changes this significantly and therefore opens up many new opportunities for applications in connection with transportation vehicles that require a radio link.

Optionally, the concept can be realized in two stages. In a first operation, the quality seen in the radio modem is observed in the safety-critical application program itself.

Stage 1: Monitoring of the Quality Measured at the Radio Modem

In this stage, the mobile radio modem hands up current quality of service details for the present time to the application layer. In contrast to the previous solution, where parameters from the channel estimation are passed on, this concept goes distinctly beyond that. On account of measurements in the physical layer, the packet delivery rate, the estimated latency of the data transmission and the ascertained data rate are also handed up to the application layer. As well as that, however, it is also possible for setting parameters such as the allocated bandwidth, the type of modulation and modulation parameters, e.g., which QAM mode is used, to be forwarded.

This information directly tells the application when the modem cannot react to channel changes (e.g., owing to the reduction in the packet delivery rate), and also how the network reacts, e.g., by changing the type of modulation or the coding scheme and/or the bandwidth.

Stage 2: Monitoring the Network State

In the second stage, the concept is distinctly extended once again. Besides measurements by the radio modem, information is also supposed to be passed on from the network to the application layer in this expansion stage. This information extends the knowledge of the quality of service in the transportation vehicle application in two dimensions:

1. The network can provide the application with information about its own state (network load, etc.) and about the state of the modem in the network (e.g., whether it has come close to a handover point, etc.). The information regarding whether the modem has arrived at a handover point corresponds in this case to the information about whether the subscriber station has come close to the cell boundary.

2. The network can also predict these parameters into the future to a certain degree. The base station of a cell can, for example, assess how many users will be in the cell in the near future. Based on that and on the current channel conditions, the cell can assess what quality of service the cell can provide to the given user in the near future. This can be supported by the transportation vehicle by virtue of the current position and the planned route being transmitted to the network.

3. In the realm of device-to-device communication, which can be operated in the out-of-coverage mode and hence without a central base station, it is conceivable for the functionality described in stage 1 in the mobile radio modem to be extended by a predictive component.

Predictions in the region of several seconds are possible in this case. This gives an application time to react to changes.

As an example of a reaction on the application layer, the safety-relevant application "platooning" is cited. This application in the transportation vehicle involves a transportation vehicle convoy being controlled in a coordinated manner. The concern here is to produce the shortest possible distances between transportation vehicles, e.g., trucks. If the application is informed about a higher level of latency for the communication in the radio network (e.g., because the network load is currently growing), the distance between the platoon participants can be increased.

The present description illustrates the principles of the disclosure. It therefore goes without saying that persons skilled in the art will be capable of designing different arrangements that, although not described explicitly here, embody principles of the disclosure and are likewise meant to be protected within the scope of the disclosure.

FIG. 1 shows the principle of vehicle communication by mobile radio. The transportation vehicles are provided with reference numeral 30. They are each equipped with a communication module 31 that is used as a transmission and reception unit for the mobile communication. All messages from the transportation vehicles (uplink) and to the transportation vehicles (downlink) are either routed via a base station serving a mobile radio cell or, in the case of vehicle direct communication (sidelink), exchanged directly between the transportation vehicles. If the transportation vehicles are inside this mobile radio cell, they are registered with the base station. The base station is referred to as network management unit 20 below. If they leave the mobile radio cell, they are handed over to the adjacent cell and accordingly deregistered on the network management unit 20. The network management unit 20 also provides access to the Internet 10, which means that the transportation vehicles 30 and all other mobile radio subscribers in the mobile radio cell are supplied with Internet data.

These techniques are standardized and in this regard reference is made to the applicable specifications of mobile radio standards. As a modern example of a mobile radio standard, reference is made to the 3GPP initiative and the LTE (Long Term Evolution) standard. Many of the associated ETSI specifications are currently available in version 13. The following are cited as examples: ETSI TS 136 213 V13.0.0 (2016-05); Evolved Universal Terrestrial Radio Access (E-UTRA); Physical layer procedures (3GPP TS 36.213 version 13.0.0 Release 13).

Figure 2:
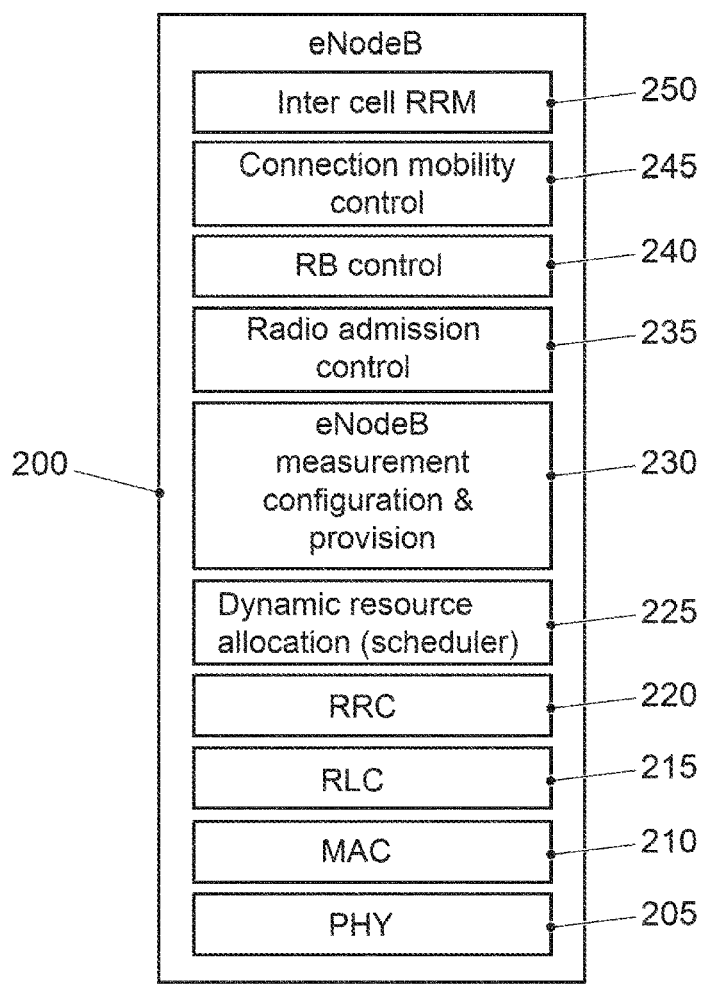
FIG. 2 shows a typical protocol stack of an LTE base station eNodeB.

The transmission resources are allocated based on the LTE standard using what is known as a "scheduler", which corresponds to a management unit managing the transmission resources. According to the LTE standard, the scheduler is arranged in the base station. This base station is referred to as eNodeB in the LTE standard and is specified accordingly. The protocol stack of such a base station eNodeB is shown in FIG. 2. The reference numeral 200 denotes all of the various implemented protocols. The reference numeral 205 denotes the physical layer, that is to say layer 1, of the ISO/OSI layer model of data communication. The data link layer, layer 2, is realized in LTE by the layers 210 medium access control layer, 215 radio link control layer and 220 radio resource control layer. Located above that is the aforementioned functionality of the scheduler, that is to say of the management unit that performs the resource allocation. This unit is denoted by the reference numeral 225. Located above that is a layer 230 that performs the evaluation of measurements and the performance of configurations for the base station eNodeB. The reference numeral 235 denotes the radio admission control layer RAC. The layer RBC, corresponding to radio bearer control, has the reference numeral 240. Arranged above that are also the layers connection mobility control CMC 245 and inter cell radio resource management RRM 250. The individual layers of the network management unit 20 are explained in more detail in the standard. The present disclosure is concerned with the layer 230, which carries out the evaluation of measurements and the performance of configurations. For this reason, more detailed explanations are provided primarily in respect of this layer 230 below. For the other listed layers, express reference is made to the LTE standard in regard to the disclosure of these layers.

For this purpose, it is pointed out that FIG. 2 in this form has been taken from the LTE standard. This is the specification ETSI TS 136 211 V13.1.0. The title of this specification is: LTE; Evolved Universal Terrestrial Radio Access (E-UTRA); Physical Channels and Modulation (3 GPP TS 36.211 Virgin 13.1.0 Release 13).

The layer 230 will perform the 2nd stage of the QoS monitoring, that is to say the provision of information about the state of the network. This information is transmitted to the mobile radio subscribers. In this case, there can be provision for the information to be transmitted only to those subscribers that have registered for this special QoS monitoring service.

In a further disclosed embodiment, the information about the state of the modem in the network is also passed on. The transportation vehicles move in a mobile radio cell, of course. If the position is known, the layer 230 can, e.g., forward the information that the modem has now reached the cell boundary and has therefore arrived at a handover point.

In another disclosed embodiment, an algorithm is implemented on layer 230 that performs a prediction of the information pertaining to the network state and/or pertaining to the state of the modem in the network. A base station of a cell can, for example, assess how many users will be in the cell in the near future. Based on that and on the current channel condition, the base station can assess what quality of service the cell can provide to the respective user in the near future. To increase the accuracy of the prediction, there is provision for the subscriber that has registered for this form of QoS monitoring to transmit its planned route and the current position to the network management unit 20. The network management unit 20 located in the base station can better assess from this which subsequent cell the subscriber will reach in the near future. Since the base stations of the different cells also exchange information with one another regarding the state of the network, such as network utilization in the cell, the network management unit 20 can inform the subscriber in good time if the QoS delivered should change along the planned route.

Predictions in the region of several seconds are possible with this solution. A further prediction and also the prediction accuracy can be achieved by virtue of more subscribers registering for the QoS monitoring service and communicating their precise route information.

As an example of a transportation vehicle-relevant application for which the extended QoS monitoring is beneficial, what is known as "platooning" is cited. This involves multiple or even many transportation vehicles being controlled in a coordinated manner by a technical control system, so that they can travel at a very short distance behind one another without road safety being impaired. Particularly in the case of trucks, this leads to a considerable reduction in fuel consumption and to a considerable reduction in greenhouse gases. This application is safety-critical, however. It is necessary to ensure at all times that the transportation vehicles in the convoy can stop, even if the QoS of the communication service used for the coordinated control deteriorates. The solution is for the distance between the transportation vehicles to be increased if a deterioration occurs in the QoS of the communication service. Conversely, the distance can be decreased again if an improvement occurs in the QoS of the communication service.

Figure 3:
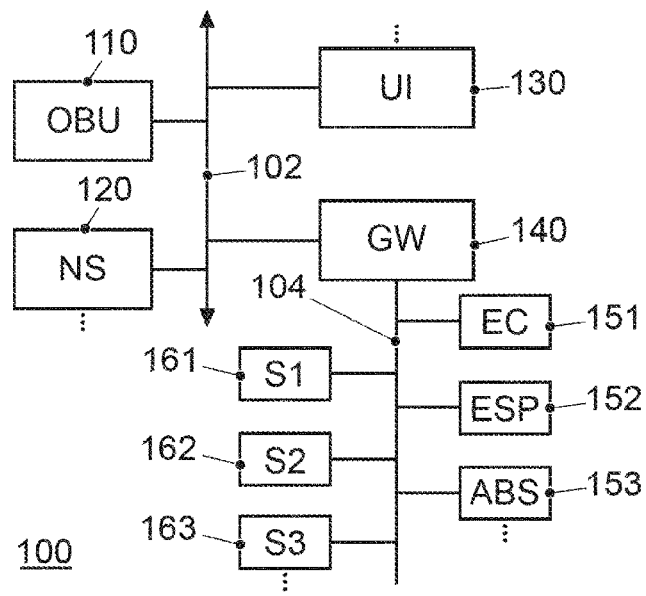
FIG. 3 shows a block diagram for the vehicle electronics of a transportation vehicle.

FIG. 3 shows the typical design of transportation vehicle electronics of a modern transportation vehicle. The reference numeral 151 denotes an engine controller. The reference numeral 152 corresponds to an ESP controller and the reference numeral 153 denotes an ABS controller. Further controllers such as gearbox controller, airbag controller, etc., may be present in the transportation vehicle. Such controllers are typically networked by the CAN (Controller Area Network) bus system 104, which is standardized as an ISO standard, ISO 11898. Since a wide variety of sensors can be installed in the transportation vehicle and these are no longer just connected to individual controllers, such sensor data are likewise transmitted to the individual controllers via the bus system 104. Examples of sensors in the transportation vehicle are wheel speed sensors, steering angle sensors, acceleration sensors, rotation rate sensors, tire pressure sensors, distance sensors, etc. The different sensors with which the transportation vehicle is equipped are denoted by the reference numerals 161, 162 and 163 in FIG. 3.

The modern transportation vehicle can also have further components, however, such as video cameras, e.g., as a reversing camera or as a driver monitoring camera, and a radar device for providing radar cruise control or for driving a distance warning or collision warning device.

There are then also further electronic apparatuses in the transportation vehicle. These are arranged more in the area of the passenger compartment and are in some cases also operated by the driver. Examples are a user interface apparatus that the driver can use to select driving modes, but also to operate conventional components. These include gear selection and also turn signal control, windshield wiper control, lights control, etc. This user interface arrangement is provided with the reference numeral 130. The user interface arrangement 130 is often also equipped with a rotary/push switch by which the driver can select the various menus displayed on a display in the cockpit. On the other hand, a touch sensitive display also falls into this category. Even voice input for assisting operator control falls into this realm.

A distinction is drawn here for a navigation system 120, which is likewise installed in the area of the cockpit. The route displayed on a map can naturally likewise be presented on the display in the cockpit. Further components, such as a hands-free device, may be present, but are not depicted in more detail. The reference numeral 110 denotes an onboard unit. This onboard unit 110 corresponds to a communication module by which the transportation vehicle can receive and send mobile data. Typically, this is a mobile radio communication module, e.g., based on the LTE standard.

The devices in the passenger compartment are likewise networked to one another by a bus system, which is denoted by the reference numeral 102. It can likewise be the CAN bus system based on the ISO 11898-2 standard, if need be in this case in an option for data transmission at a higher data rate between infotainment devices. For the purpose of transmitting transportation vehicle-relevant sensor data to another transportation vehicle or to a central computer via the communication interface 110, the gateway 140 is provided. This is connected to the two different bus systems 102 and 104. The gateway is designed to convert the data that it receives via the CAN bus 104 such that they are converted into the transmission format of the high speed CAN bus 102, so that they can be distributed in the packets specified thereon. For the purpose of forwarding these data externally, that is to say to another transportation vehicle or to a central computer, the onboard unit with the communication interface 110 is equipped to receive these data packets and again to convert them into the transmission format of the accordingly used mobile radio standard.

Figure 4:
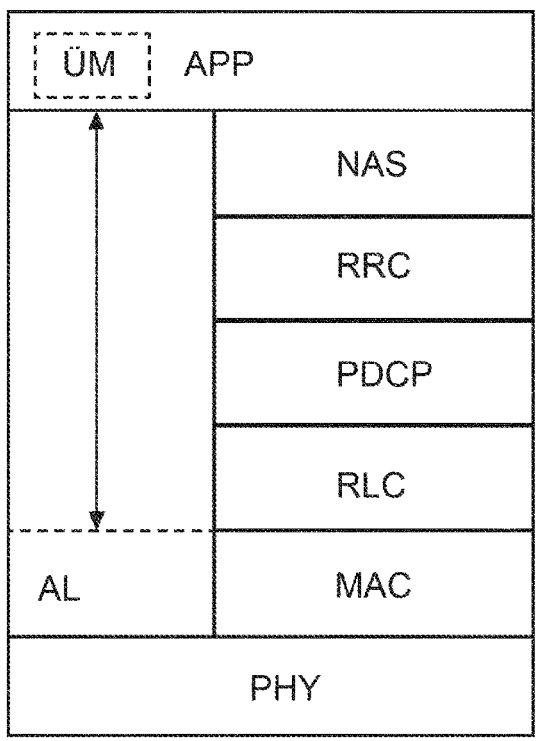
FIG. 4 shows a protocol stack of an LTE subscriber station.

FIG. 4 shows a protocol stack of an LTE subscriber station, typically referred to as user equipment (UE) in LTE terminology. The lowest layer relates to the physical layer PHY. The layers above that are medium access layer MAC, radio link control layer RLC, packet data convergence layer PDCP, radio resource control layer RRC and network access stratum NAS. Above that is the application layer APP. Running on this layer are the data-relevant applications, that is to say, e.g., the aforementioned platooning application. Since the individual layers in FIG. 4 are built on one another and communicate with one another via defined interfaces, access from the application layer to the physical layer is not a simple matter. This cross-layer access is needed for the QoS monitoring proposed here. To achieve this independently of hardware, there is provision for the implementation of an abstraction layer AL in the protocol stack shown in FIG. 4. In the example of FIG. 4, the cross-layer access is indicated by the arrow between the physical layer PHY and the abstraction layer AL. The information about the state of the network arrives in the subscriber station in the protocol stack likewise via the physical layer PHY. It can likewise be collected via the abstraction layer AL. Such abstraction layers have already been specified by the 3GPP, e.g., for the exchange of information between base station eNodeB and subscriber station UE as part of the hybrid automatic repeat request (HARQ) process.

The connection quality monitoring module UM may be realized as a program module of the application program in the application layer APP. In at least one exemplary embodiment, this module collects the necessary information from the physical layer PHY and the layer providing the network state information. Alternatively, the module could be realized as a standalone application program. In that case, it would need to have a defined interface via which it can interchange data with other application programs.

Figure 5:
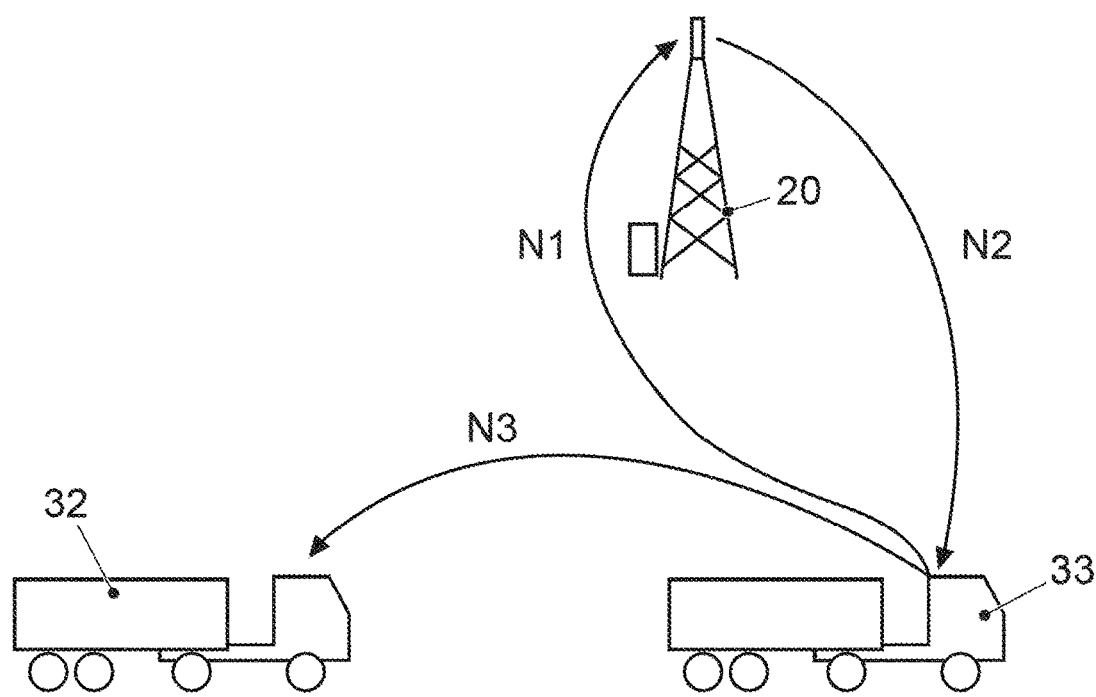
FIG. 5 shows the message interchange between subscriber station and network management unit for the "platooning" instance of application.

FIG. 5 also shows the sequence of communication for the instance of application of the aforementioned "platooning".

The figure depicts just two trucks 32, 33 in a transportation vehicle convoy. The transportation vehicle 33 traveling in front is what is known as the platoon lead transportation vehicle. It coordinates the convoy transportation vehicles 32 belonging to the platoon. The figure depicts only one further convoy transportation vehicle 32. Further transportation vehicles can belong to the convoy, however. The platoon lead transportation vehicle 33 communicates with the base station 20 and notifies the network management unit about the current position and the planned route of the convoy using a first message N1. The network management unit provides the platoon lead transportation vehicle 33 with the information about the network state in a message N2, including the network load and/or information about the state of the subscriber station in the network. The information provided about the state of the subscriber station is the information that the transportation vehicle 33 is approaching the cell boundary of the mobile radio cell managed by the base station 20.

The platoon lead transportation vehicle 33 rates the information, and passes on the information to the application layer APP. In the case under consideration, in which the application relates to the "platooning" case, the application will react accordingly, e.g., when connection quality is deteriorating, it tells the convoy transportation vehicles 32 that they need to increase the distance from the transportation vehicle traveling in front. This information is transmitted in the message N3, as depicted in FIG. 5.

It should be understood that the proposed method and the associated apparatuses can be implemented in various forms of hardware, software, firmware, special processors or a combination of these. Special processors can comprise application specific integrated circuits (ASICs), reduced instruction set computers (RISCs) and/or field programmable gate arrays (FPGAs). Optionally, the proposed method and the apparatus are implemented as a combination of hardware and software. The software may be installed as an application program on a program memory apparatus. Typically, it is a machine on the basis of a computer platform that has hardware, such as, for example, one or more central units (CPU), a random access memory (RAM) and one or more input/output (I/O) interface(s). An operating system is moreover typically installed on the computer platform. The various processes and functions described here may be part of the application program, or a part executed by the operating system.

The disclosure is not restricted to the exemplary embodiments described here. There is latitude for various adaptations and modifications that a person skilled in the art would, on the basis of his knowledge in the art, consider as also being part of the disclosure.

The presented concept can be used not only in the realm of mobile radio communication. The realm of WLAN IEEE 802.11x, in particular, IEEE 802.11p, communication, too, has communication in cells and handover, and the presented solutions can be used therein.

LIST OF REFERENCE SIGNS

10 Internet
20 Base station
30 Mobile subscriber station
31 Communication module
32 Mobile subscriber station
33 Mobile subscriber station
100 Block diagram of transportation vehicle electronics
102 High-speed CAN bus
104 CAN bus
110 Onboard unit
120 Navigation system
130 User interface arrangement
140 Gateway
151 Engine controller
152 ESP controller
153 ABS controller
161 Sensor 1
162 Sensor 2
163 Sensor 3
200 Protocol stack
205 PHY layer
210 MAC layer
215 RLC layer
220 RRC layer
225 Scheduler
230 Measurement, configuration & management layer
235 RAC layer
240 RBC layer
245 CMC layer
250 RRM layer
APP Application layer
ÜM Monitoring module
NAS NAS layer
RRC RRC layer
PDCP PDCP layer
RLC RLC layer
MAC Medium access layer
AL Adaptation layer
PHY Physical layer
N1 1st message
N2 2nd message
N3 3rd message

The invention claimed is:

1. A method for monitoring quality of a data connection of a transportation vehicle within a transmission network, the method comprising:

establishing, by a communication module of a transportation vehicle including, the data connection between the communication module and a base station of a cell of the transmission network via a radio channel;

establishing, by the communication module, a vehicle-to-vehicle data connection with another communication module of another transportation vehicle, wherein the transportation vehicle and the another transportation vehicle are engaged in a platooning maneuver to produce a shortest possible following distance between the transportation vehicle and the another transportation, wherein the transportation vehicle is a platooning lead vehicle, and wherein the another transportation vehicle is a platooning convoy vehicle;

receiving, at an abstraction layer and at a physical layer of the communication module, data from the transmission network, wherein the data is indicative of a state of the data connection with the transmission network, and wherein the physical layer directly interfaces with the abstraction layer and is separate from a data link layer;

monitoring, by a monitoring module of an application program in an application layer of the communication module, the state of the data connection based on the data, wherein the application layer interfaces with the physical layer via an abstraction layer and the data is received by the monitoring module from the abstraction layer and from the physical layer via the abstraction layer and without passing through the data link layer and one or more other intermediate layers, wherein the data is supplemented with quality of service parameters measured at the physical layer and received by the monitoring module, and wherein the measured quality of service parameters indicate a present latency of the data connection;
in response to the present latency being greater than a previously measured latency of the data connection, transmitting, by the communication module, a notification to the another communication module to increase the following distance between the transportation vehicle and the another transportation vehicle; and
in response to the present latency being less than the previously measured latency of the data connection, transmitting, by the communication module, a notification to the another communication module to decrease the following distance between the transportation vehicle and the another transportation vehicle.

2. The method of claim 1, wherein the information passed on to the monitoring module about the state of the transmission network is the information about the network load and/or information about the state of the subscriber station in the network.

3. The method of claim 2, wherein the information about the state of the subscriber station in the network specifies whether the subscriber station has come close to a cell boundary.

4. The method of claim 3, wherein the subscriber station transmits the information about the current position of the subscriber station and the planned route to the network management unit.

5. The method of claim 1, further comprising receiving a predicted future state of the transmission network determined by a network management unit of the transmission network.

6. The method of claim 5, wherein the information about the current position of the subscriber station and the planned route of the subscriber station is considered for the prediction of the state of the transmission network.

7. A communication module of a transportation vehicle for monitoring quality of a data connection with a base station of a cell of a transmission network, the communication module comprising:
an application program including a monitoring module and residing at an application layer of the mobile subscriber station,
wherein the application program establishes a vehicle-to-vehicle data connection with another application program of another communication module of another transportation vehicle, wherein the transportation vehicle and the another transportation vehicle are engaged in a platooning maneuver to produce a shortest possible following distance between the transportation vehicle and the another transportation, wherein the transportation vehicle is a platooning lead vehicle, and wherein the another transportation vehicle is a platooning convoy vehicle,
wherein the monitoring module monitors a state of the data connection at least based on quality of service parameter measurements taken at a physical layer of the communication module,
wherein the physical layer is separate from a data link layer,
wherein the application layer interfaces with the physical layer via an abstraction layer,
wherein the measurements in the physical layer are passed on directly to the application layer via the abstraction layer and without passing through the data link layer and one or more other intermediate layers, wherein the monitoring module monitors the state of the data connection based on information received, from the transmission network, at the abstraction layer and the physical layer, wherein the information is indicative of a transmission network state wherein the monitored quality of service parameters indicate a present latency of the data connection;
wherein, in response to the present latency being greater than a previously measured latency of the data connection, the monitoring module transmits a notification to the another communication module to increase the following distance between the transportation vehicle and the another transportation vehicle, and
wherein, in response to the present latency being less than the previously measured latency of the data connection, the monitoring module transmits a notification to the another communication module to decrease the following distance between the transportation vehicle and the another transportation vehicle.

8. The subscriber station of claim 7, wherein the subscriber station transmits the information about the current position of the subscriber station and the planned route to a network management unit, and receives the information about the state of the transmission network from the network management unit.

9. A network management unit for monitoring quality of a data connection of a base station of a cell of a transmission network with a communication module of a transportation vehicle, the network management unit being configured to transmit to the communication module data indicating a state of the data connection, wherein the communication module establishes a vehicle-to-vehicle data connection with another communication module of another transportation vehicle, wherein the transportation vehicle and the another transportation vehicle are engaged in a platooning maneuver to produce a shortest possible following distance between the transportation vehicle and the another transportation, wherein the transportation vehicle is a platooning lead vehicle, and wherein the another transportation vehicle is a platooning convoy vehicle
wherein the data is received at an abstraction layer and a physical layer of the communication module, wherein the physical layer is separate from a data link layer, wherein the physical layer interfaces with an application layer of the communication module via the abstraction layer, and wherein a monitoring module of an application program in the application layer monitors the state of the data connection based on a combination of the data, received at the abstraction layer and the physical layer, and quality of service parameter measurements taken at the physical layer and passed on directly to the application layer via the abstraction layer without passing through the data link layer and one or more other intermediate layers,
wherein the measured quality of service parameters indicate a present latency of the data connection, wherein, in response to the present latency being greater than a previously measured latency of the data connection, the communication module transmits a notification to the another communication module to increase the following distance between the transportation vehicle and the another transportation vehicle, and wherein, in response to the present latency being less than the previously measured latency of the data connection, the communication module transmits a notification to the another communication module to decrease the following distance between the transportation vehicle and the another transportation vehicle, the network management unit comprising a unit for monitoring the network state, wherein the unit for monitoring the network state sends information about the network state to one or more subscriber stations for receiver-end appraisal of the network state based on the information.

10. The network management unit of claim 9, wherein the unit for monitoring the network state predicts the information about the state of the transmission network into the future.

11. The network management unit of claim 9, wherein the unit for monitoring the network state sends the information about the network load and/or information about the state of the subscriber station in the network to one or more subscriber stations.

12. The network management unit of claim 11, wherein the information about the state of the subscriber station in the network specifies whether the subscriber station has come close to a cell boundary.

13. The network management unit of claim 9, wherein the unit for monitoring the network state is part of a mobile radio base station eNodeB.

14. The method of claim 1, wherein the parameters of the data connection include allocated bandwidth and/or a type of modulation used with set modulation parameters.

15. The subscriber station of claim 8, wherein the parameters of the data connection include allocated bandwidth and/or a type of modulation used with set modulation parameters.

* * * * *